(12) United States Patent
Pak et al.

(10) Patent No.: US 12,291,790 B2
(45) Date of Patent: May 6, 2025

(54) WATER ELECTROLYSIS CATALYST AND MANUFACTURING METHOD THEREOF

(71) Applicant: GWANGJU INSTITUTE OF SCIENCE AND TECHNOLOGY, Gwangju (KR)

(72) Inventors: Chanho Pak, Gwangju (KR); Chaekyung Baik, Gwangju (KR); Seungwoo Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 966 days.

(21) Appl. No.: 17/361,838

(22) Filed: Jun. 29, 2021

(65) Prior Publication Data
US 2021/0404074 A1    Dec. 30, 2021

(30) Foreign Application Priority Data
Jun. 30, 2020    (KR) .................. 10-2020-0080237

(51) Int. Cl.
| | | |
|---|---|---|
| *C25B 11/081* | (2021.01) | |
| *B01J 23/46* | (2006.01) | |
| *B01J 37/04* | (2006.01) | |
| *B01J 37/08* | (2006.01) | |
| *B01J 37/12* | (2006.01) | |

(Continued)

(52) U.S. Cl.
CPC .......... *C25B 11/081* (2021.01); *B01J 23/468* (2013.01); *B01J 37/04* (2013.01); *B01J 37/08* (2013.01); *B01J 37/12* (2013.01); *B01J 37/16* (2013.01); *C25B 1/04* (2013.01)

(58) Field of Classification Search
CPC ....... C25B 1/04; C25B 11/075; C25B 11/081; C25B 11/091
See application file for complete search history.

(56) References Cited

U.S. PATENT DOCUMENTS

2017/0233879 A1*  8/2017  Kumta ............... C25B 9/73
                                                  502/226
2019/0296364 A1*  9/2019  Nakano ............. C25B 9/73
(Continued)

FOREIGN PATENT DOCUMENTS

KR    10-2014-0135306 A    11/2014

OTHER PUBLICATIONS

Alessandro Minguzzi et al., Easy Accommodation of Different Oxidation States in Iridium Oxide Nanoparticles with Different Hydration Degree as Water Oxidation Electrocatalysts, ACS Catalysis 2015 5 (9), 5104-5115 (Year: 2015).*

(Continued)

*Primary Examiner* — Luan V Van
*Assistant Examiner* — Mofoluwaso S Jebutu
(74) *Attorney, Agent, or Firm* — Bridgeway IP Law Group, PLLC; Jihun Kim (57) ABSTRACT

An embodiment provides a catalyst for water electrolysis which includes an iridium mixed phase formed by physical mixing of two or more selected from metal iridium (Ir), iridium(III) oxide ($Ir_2O_3$), or iridium(IV) oxide ($IrO_2$) and has a structure in which nanosheets composed of the iridium mixed phase are stacked. The catalyst for water electrolysis may exhibit high activity and stability for the oxygen evolution reaction in water electrolysis.

8 Claims, 7 Drawing Sheets

(51) Int. Cl.
*B01J 37/16* (2006.01)
*C25B 1/04* (2021.01)

(56) References Cited

U.S. PATENT DOCUMENTS

2020/0087164 A1* 3/2020 Boissiere ............. C01G 55/004
2021/0371993 A1* 12/2021 Yamauchi ............. C25B 11/075

OTHER PUBLICATIONS

Yecan Pi, Nan Zhang, Shaojun Guo, Jun Guo, and Xiaoqing Huang, Ultrathin Laminar Ir Superstructure as Highly Efficient Oxygen Evolution Electrocatalyst in Broad pH Range, Nano Letters 2016 16 (7), 4424-4430 (Year: 2016).*

Takimoto, D., Fukuda, K., Miyasaka, S. et al. Synthesis and Oxygen Electrocatalysis of Iridium Oxide Nanosheets. Electrocatalysis 8, 144-150 (2017). (Year: 2017).*

Shaun M. Alia et al., "The Roles of Oxide Growth and Sub-Surface Facets in Oxygen Evolution Activity of Iridium and Its Impact on Electrolysis", Journal of The Electrochemical Society, 166 (15) F1243-F1252 (2019), Nov. 20, 2019.

* cited by examiner

WATER ELECTROLYSIS CATALYST AND MANUFACTURING METHOD THEREOF

BACKGROUND OF THE INVENTION

Field of the Invention

The present invention relates to a catalyst for water electrolysis and a method for producing the same, more specifically to a catalyst for water electrolysis containing iridium and a method for producing the same.

Description of the Related Art

Hydrogen energy has recently been in the spotlight as energy that can replace existing fossil fuels. Hydrogen energy can be easily obtained by electrolyzing water and is eco-friendly since water is generated when hydrogen is burned.

Water electrolysis can be divided into two half-cell reactions, one of which is the hydrogen evolution reaction (HER) that occurs at the cathode and the other is the oxygen evolution reaction (OER) that occurs at the anode.

Water electrolysis theoretically occurs at 1.23 V regardless of pH, but the reaction rate is significantly slow at 1.23 V in practice, and an overpotential more than 1.23 V is required. More amounts of oxygen and hydrogen can be generated as the overpotential is higher, but a problem arises that the cost of electrical energy also increases accordingly. At this time, sufficient amounts of oxygen and hydrogen can be generated even at a low overpotential if the overpotential required for the half reaction at each electrode can be lowered.

For this reason, precious metals such as Ir, Pd, Pt, Au, and Ru as a catalyst that can lower the overpotential in oxygen evolution reaction and hydrogen evolution reaction have been conventionally used in the electrodes to increase the efficiency of fuel cells, water electrolysis, and batteries.

However, these metals are expensive, and it is thus required to investigate a catalyst that exhibits the maximum catalytic activity even in a smaller amount.

CITATION LIST

Patent Literature

Patent Literature 1: Korean Registered Patent Publication No. 10-2014-0135306

SUMMARY OF THE INVENTION

The technical object to be achieved by the present invention is to provide a catalyst for water electrolysis and a method for producing the same.

The technical object to be achieved by the present invention is not limited to the technical objects mentioned above, and other technical objects that are not mentioned will be clearly understood by those skilled in the art to which the present invention pertains from the following description.

In order to achieve the technical object, an embodiment of the present invention provides a catalyst for water electrolysis.

In an embodiment of the present invention, the catalyst for water electrolysis includes an iridium mixed phase formed by physical mixing of two or more selected from metal iridium (Ir), iridium(III) oxide ($Ir_2O_3$), or iridium(IV) oxide ($IrO_2$) and has a structure in which nanosheets composed of the iridium mixed phase are stacked.

In an embodiment of the present invention, the molar ratio among iridium with 0 oxidation number, iridium with +3 oxidation number, and iridium with +4 oxidation number contained in the iridium mixed phase may be 76:0:24 to 0:39:61.

In an embodiment of the present invention, the content of the metal iridium may be 76 at % or less with respect to the total atomic percentage of iridium.

In order to achieve the technical object, another embodiment of the present invention provides a catalyst for water electrolysis which has diffraction patterns with 2θ diffraction angles of 9.26±0.1°, 19.01±0.1°, 29.64±0.1°, 37.64±0.1°, 56.79±0.1°, 67.50±0.1°, and 79.81±0.1° in X-ray diffraction (XRD) analysis and includes an iridium mixed phase formed by physical mixing of two or more selected from metal iridium (Ir), iridium(III) oxide ($Ir_2O_3$), or iridium(IV) oxide ($IrO_2$).

In order to achieve the technical object, still another embodiment of the present invention provides a method for producing a catalyst for water electrolysis.

In an embodiment of the present invention, the method for producing a catalyst for water electrolysis includes forming a first mixture by adding an oxygen-providing additive to a solvent; forming a second mixture by adding a solution containing a reducing agent and an iridium precursor to the first mixture; and subjecting the second mixture to a heat treatment for oxidation-reduction reaction.

In an embodiment of the present invention, the solvent may include one or more selected from the group consisting of ethylene glycol, diethylene glycol, and triethylene glycol.

In an embodiment of the present invention, the oxygen-providing additive may include one or more selected from the group consisting of sodium acetate, potassium acetate, lithium acetate, magnesium acetate, and calcium acetate.

In an embodiment of the present invention, the reducing agent may include one or more selected from the group consisting of formic acid, sodium formate, formaldehyde, acetaldehyde, benzaldehyde, propionaldehyde, butyraldehyde, and glyoxal.

In an embodiment of the present invention, the iridium precursor solution may include one or more selected from the group consisting of iridium fluoride, iridium chloride, iridium bromide, iridium iodide, iridium acetate, iridium acetylacetonate, iridium nitrate, and hydrates thereof.

In an embodiment of the present invention, the iridium precursor and the oxygen-providing additive may be reacted at a molar ratio of 1 0 to 1:14.6.

In an embodiment of the present invention, the heat treatment may be performed at a temperature of 100° C. to 200° C. for 1 hour to 24 hours.

DETAILED DESCRIPTION OF THE PREFERRED EMBODIMENTS

Hereinafter, the present invention will be described with reference to the accompanying drawings. However, the present invention may be implemented in a number of different forms and therefore is not limited to the embodiments described herein. In the drawings, parts irrelevant to the description are omitted in order to clearly describe the present invention, and similar reference numerals are attached to similar parts throughout the specification.

Throughout the specification, when a part is said to be "connected (coupled, in contact, bonded)" with another part, this includes not only the case of being "directly connected" but also the case of being "indirectly connected" with another member interposed therebetween. In addition, when a part "includes" a certain component, this means that other components are not excluded but may be further provided unless specifically stated to the contrary.

The terms used in the present specification are only used to describe specific embodiments and are not intended to limit the present invention. Singular expressions include plural expressions unless the context clearly indicates otherwise. In the present specification, terms such as "include" or "have" are intended to designate the existence of features, numbers, steps, actions, components, parts, or combinations thereof described in the specification and should be understood as not precluding the possibility of existence or addition of one or more other features, numbers, steps, actions, components, parts, or combinations thereof.

A catalyst for water electrolysis according to an embodiment of the present invention will be described.

Figure 1:
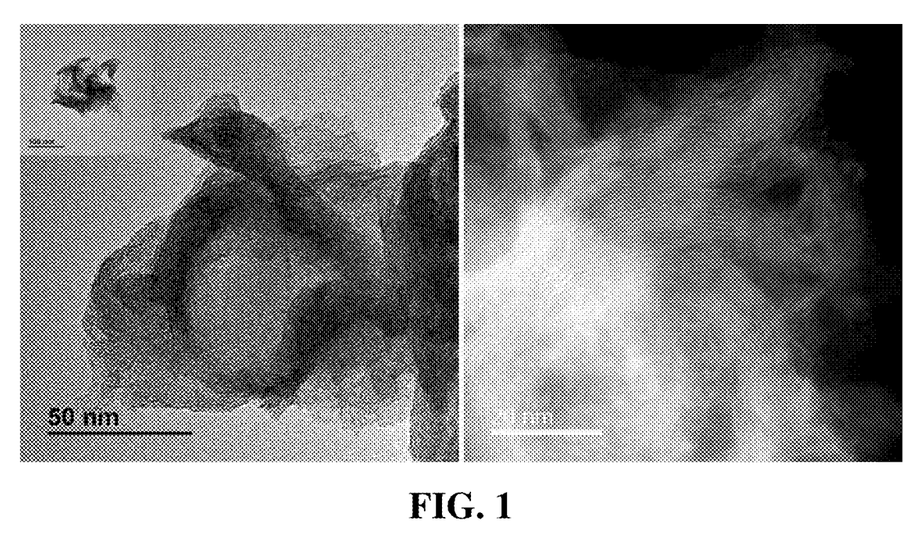
FIG. 1 is a TEM image of a catalyst for water electrolysis according to an embodiment of the present invention.

FIG. 1 is a TEM image of a catalyst for water electrolysis according to an embodiment of the present invention.

Referring to FIG. 1, the catalyst for water electrolysis according to an embodiment of the present invention includes an iridium mixed phase formed by physical mixing of two or more selected from metal iridium (Ir), iridium(III) oxide ($Ir_2O_3$), or iridium(IV) oxide ($IrO_2$) and has a structure in which nanosheets composed of the iridium mixed phase are stacked.

The iridium mixed phase may include, for example, metal iridium (Ir) and iridium(IV) oxide ($IrO_2$) or iridium(III) oxide ($Ir_2O_3$) and iridium(IV) oxide ($IrO_2$).

The iridium mixed phase constitutes a nanosheet, and nanosheets composed of the iridium mixed phase are stacked to form the catalyst structure of the present invention.

The oxidation number of metal iridium (Ir) is 0, the iridium oxidation number in iridium(III) oxide ($Ir_2O_3$) is +3, and the iridium oxidation number in iridium(IV) oxide ($IrO_2$) is +4.

The molar ratio among iridium with 0 oxidation number, iridium with +3 oxidation number, and iridium with +4 oxidation number contained in the iridium mixed phase may be 76:0:24 to 0:39:61.

When the molar ratio is out of the range, the movement of electrons may be restricted during the oxygen evolution reaction or unstable phases may exist and the catalytic activity or stability may decrease.

In other words, the content of metal iridium (Ir) may be 76 at % or less with respect to the total atomic percentage of iridium.

When the content of metal iridium (Ir) exceeds 76 at %, unstable phases may exist and the catalytic activity may decrease.

The content of iridium with +4 oxidation number may be 61 at % or less.

When the content of iridium with +4 oxidation number exceeds 61 at %, the movement of electrons may be restricted during the oxygen evolution reaction and the catalytic activity may decrease.

The catalyst for water electrolysis of an embodiment of the present invention can exhibit high activity and stability for the oxygen evolution reaction in water electrolysis.

Figure 2:
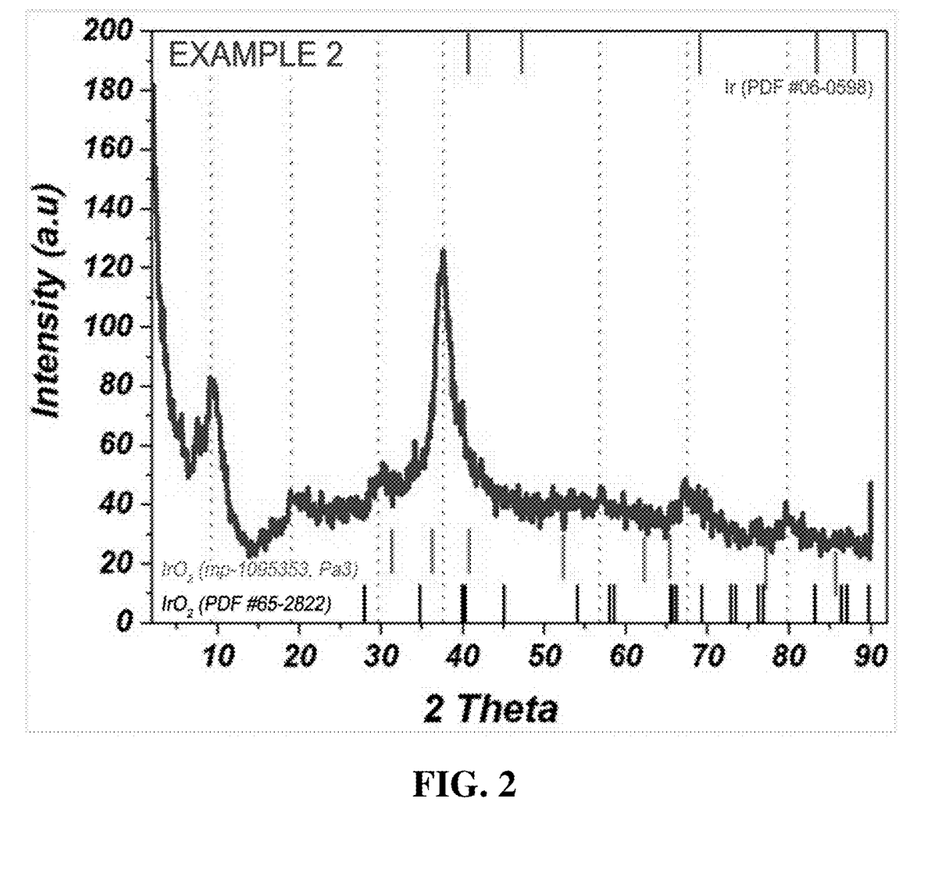
FIG. 2 is an XRD diffraction pattern of a catalyst for water electrolysis according to an embodiment of the present invention.

FIG. 2 is an XRD diffraction pattern of a catalyst for water electrolysis according to an embodiment of the present invention.

Referring to FIG. 2, the catalyst for water electrolysis according to an embodiment of the present invention has diffraction patterns with 2θ diffraction angles of 9.26±0.1°, 19.01±0.1°, 29.64±0.1°, 37.64±0.1°, 56.79±0.1°, 67.50±0.1°, and 79.81±0.1° in X-ray diffraction (XRD) analysis, includes an iridium mixed phase formed by physical mixing of two or more selected from metal iridium (Ir), iridium(III) oxide ($Ir_2O_3$), or iridium(IV) oxide ($IrO_2$), and has a structure in which nanosheets composed of the iridium mixed phase are stacked.

XRD (X-ray diffraction) analysis is a method for analyzing the structure of a sample by irradiating the sample with X-rays. When X-rays collide with the crystal, some of X-rays undergo diffraction. As the diffraction angle and intensity are unique for each substance, the information on the structure, kind, and quantity of a crystalline substance can be acquired from this diffraction line.

The above diffraction pattern does not match the existing iridium metal (Ir) structure or iridium oxide structure, so it can be seen that the iridium mixed phase is an iridium mixed phase with a novel structure in a new form.

The diffraction pattern with a 2θ diffraction angle of 9.26±0.1° may be attributed to a layered hydrous sheet shape.

The layered hydrous sheet shape means the shape of a self-assembled stacked nanosheet.

In particular, the peaks corresponding to 19.01±0.1°, 29.64±0.1°, and 37.64±0.1° may be due to characteristics exerted by a lamella structure.

The lamella structure is generally a three-dimensional structure in which lipid bimolecular layers are stacked and means a structure with a polar group on the outside and a fat chain on the inside. In the present invention, the lamella structure means a new structure having constant interlayer spacing.

The measurement conditions of the XRD spectrum for measuring the XRD diffraction pattern may be, for example, as follows.

1) Instrument: MAX Ultima III, Rigaku, Japan/X-ray source: Cu Kα radiation source
2) Tube voltage: 40 KV/Tube current: 40 mA 3) Divergence slit: 2/3°/Scattering slit: 2/3°/Receiving slit: 0.3 mm
4) Scanning range: 2° to 90° 2θ
5) Scan speed: 2°/min A method for producing a catalyst for water electrolysis according to another embodiment of the present invention will be described.

Figure 3:
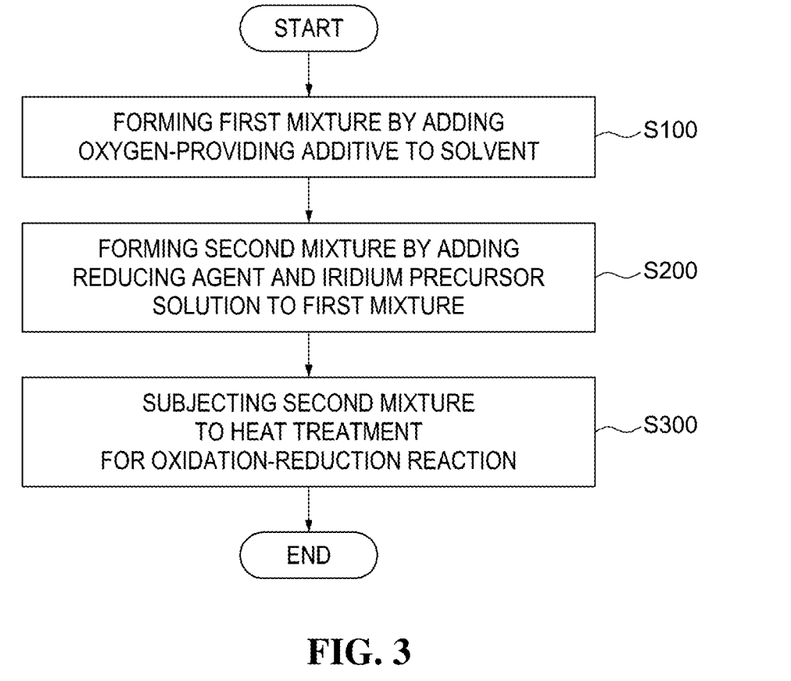
FIG. 3 is a flow chart of a method for producing a catalyst for water electrolysis according to an embodiment of the present invention.

FIG. 3 is a flow chart of a method for producing a catalyst for water electrolysis according to an embodiment of the present invention.

Figure 4:
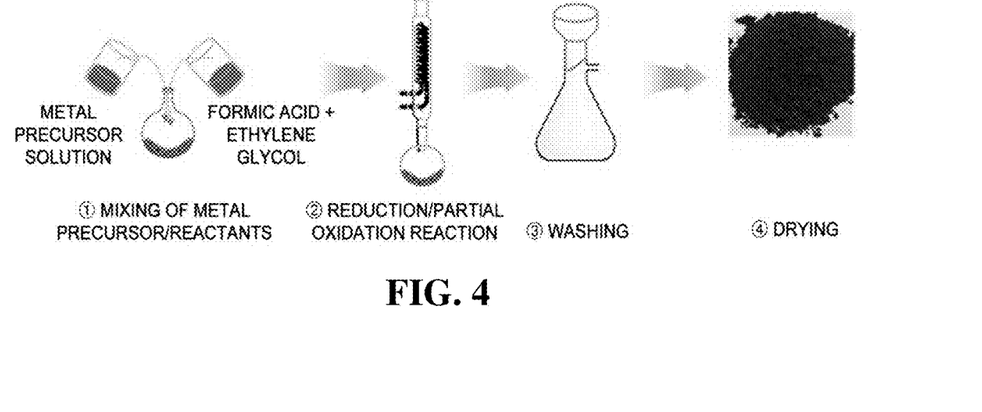
FIG. 4 is a schematic diagram of a method for producing a catalyst for water electrolysis according to an embodiment of the present invention.

FIG. 4 is a schematic diagram of a method for producing a catalyst for water electrolysis according to an embodiment of the present invention.

Referring to FIGS. 3 and 4, the method for producing a catalyst for water electrolysis according to another embodiment of the present invention includes a step S100 of forming a first mixture by adding an oxygen-providing additive to a solvent; a step S200 of forming a second mixture by adding a solution containing a reducing agent and an iridium precursor to the first mixture; and a step S300 of subjecting the second mixture to a heat treatment for oxidation-reduction reaction.

In the first step, a first mixture is formed by adding an oxygen-providing additive to a solvent (S100).

The solvent may include one or more selected from the group consisting of ethylene glycol, diethylene glycol, and triethylene glycol.

It is preferable that the solvent is sufficiently supplied so that the iridium precursor, the oxygen-providing additive, and the reducing agent are dissolved to be in an appropriate state for the reaction.

For example, as the ratio of the solvent to the iridium precursor, the amount of the solvent is preferably 100 to 500 mL per 0.1 g of the metal in the precursor. When the amount of the solvent is less than 100 mL, aggregation between nanoparticles may occur during synthesis and this may adversely affect the dispersion of particles. When the solvent is used in an excessive amount of more than 500 mL, the concentration of the reaction solution is too thin and not only the reaction time is prolonged but also the precursor may not be sufficiently oxidized.

By dissolving the oxygen-providing additive in the solvent in advance, side reactions when the precursor and the reducing agent are added in a later step can be prevented in advance.

The oxygen-providing additive may include one or more selected from the group consisting of sodium acetate, potassium acetate, lithium acetate, magnesium acetate, and calcium acetate. For example, the oxygen-providing additive may be sodium acetate.

The oxygen-providing additive reacts to oxidize and reduce the iridium precursor in the next step and changes the oxidation number of the final product, so desired catalytic activity can be achieved by appropriately controlling the amount of the oxygen-providing additive.

For example, 170 g of ethylene glycol and 2 g of sodium acetate may be mixed and stirred at room temperature for 3 hours to form a first mixture.

In the second step, a second mixture is formed by adding a solution containing a reducing agent and an iridium precursor to the first mixture (S200).

In order to facilitate mixing and reaction, the second mixture may be stirred at room temperature for about 5 minutes.

The reducing agent may include one or more selected from the group consisting of formic acid, sodium formate, formaldehyde, acetaldehyde, benzaldehyde, propionaldehyde, butyraldehyde, and glyoxal. For example, the reducing agent may be formic acid.

The reducing agent reduces iridium and decomposes to release carbon monoxide, and the released carbon monoxide adheres to the reduced Ir metal surface and may contribute to the formation of a layered hydrous sheet and a lamella structure.

The reducing agent may be used in an excessive amount with respect to the amount of the iridium precursor.

The iridium precursor solution may include one or more selected from the group consisting of iridium fluoride, iridium chloride, iridium bromide, iridium iodide, iridium acetate, iridium acetylacetonate, iridium nitrate, and hydrates thereof.

The iridium precursor compound is not particularly limited as long as it can provide iridium ions and may be selected from iridium halides such as iridium fluoride, iridium chloride, iridium bromide, and iridium iodide or hydrates thereof; iridium salts of organic acids such as iridium acetate (for example, a compound represented by $Ir(CH_3COO)_n$, where n may be an integer 1 to 5) and iridium acetylacetonate or hydrates thereof, or iridium salts of inorganic acids such as iridium nitrate or hydrates thereof.

Iridium chloride may be at least one selected from the group consisting of $IrCl_2$, $IrCl_3$, and $IrCl_4$, and $IrCl_3$ exhibiting excellent solubility in water is used in an embodiment of the present invention.

For example, 207 g of formic acid and 12.5 g of an 8 wt % $IrCl_3$ aqueous solution may be added to the first mixture and then the mixture may be stirred at room temperature for 5 minutes to form a second mixture.

The iridium precursor and the oxygen-providing additive may be reacted at a molar ratio of 1:0 to 1:14.6.

When the molar ratio exceeds 1:14.6, the X-ray diffraction (XRD) pattern of the catalyst for water electrolysis of the present invention may not have main peaks with 2θ diffraction angles of 9.26±0.1°, 19.01±0.1°, 29.64±0.1°, 37.64±0.1°, 56.79±0.1°, 67.50±0.1°, and 79.81±0.1°.

The X-ray diffraction pattern may not have a main peak particularly with a 2θ diffraction angle of 37.64±0.1°.

The iridium precursor reacts with the oxygen-providing additive to control the oxidation number of the iridium catalyst of the final product, and the oxygen-providing additive may act as a limiting reactant at this time.

For example, the final product (Example 4) when the iridium precursor and the oxygen-providing additive are reacted at a molar ratio of 1:1.8 may contain iridium ($Ir^0$) with 0 oxidation number at 10 at %, iridium ($Ir^{3+}$) with +3 oxidation number at 63 at %, and iridium ($Ir^{4+}$) with +4 oxidation number at 27 at %. The final product (Example 2) when the iridium precursor and the oxygen-providing additive are reacted at a molar ratio of 1:7.3 may contain iridium ($Ir^{3+}$) with +3 oxidation number at 57 at % and iridium ($Ir^{4+}$) with +4 oxidation number at 43 at %. The catalytic activity changes as the oxidation number of iridium changes, and thus the oxidation number of iridium may be controlled by the molar ratio between the iridium precursor and the oxygen-providing additive in the reaction.

In the third step, the second mixture is subjected to a heat treatment for oxidation-reduction reaction to produce a catalyst for water electrolysis (S300).

Iridium is reduced to metal iridium at the beginning of the heat treatment, and oxidized iridium grows on the surface when growth and stacking of particles begin.

The heat treatment may be performed at a temperature of 100° C. to 200° C. for 1 to 24 hours.

The reaction may not easily occur when the temperature is less than 100° C., and the final product does not exist as a mixed phase but as a single phase of iridium ($Ir^{4+}$) with +4 oxidation number and thus catalytic activity may decrease when the temperature exceeds 200° C.

For example, the second mixture may be reacted at 120° C. for 5 hours and then washing and drying may be performed to produce a catalyst for water electrolysis.

The conditions such as the temperature for heat treatment are considerably mild as compared to the existing conditions such as the temperature for catalyst production, so the production cost and the like can be decreased.

TABLE 1

| | Amount of sodium acetate added (g) to 12.5 g of 8 wt % $IrCl_3$ aqueous solution | $IrCl_3$:sodium acetate (molar ratio) |
|---|---|---|
| Example 1 | 4 g | 1:14.6 |
| Example 2 | 2 g | 1:7.3 |
| Example 3 | 1 g | 1:3.6 |
| Example 4 | 0.5 g | 1:1.8 |
| Example 5 | 0.25 g | 1:0.9 |
| Example 6 | 0 g | 1:0 |

Example 1

To 170 g of ethylene glycol (EG), 4 g of sodium acetate was added, and the mixture was stirred at room temperature for 3 hours. Next, 207.4 g of formic acid and 12.5 g of 8 wt % $IrCl_3$ hydrate were added thereto, and the mixture was stirred at room temperature for 5 minutes. Next, the mixture was reacted at 393 K for 5 hours, and then washing and drying were performed to produce the catalyst for water electrolysis of Example 1 (see Table 1 above).

Examples 2 to 6

The catalysts for water electrolysis of Examples 2, 3, 4, 5, and 6 were produced under the same conditions as in Example 1 except that 2 g, 1 g, 0.5 g, 0.67 g, and 0 g of sodium acetate were added in Example 1 (see Table 1 above).

Comparative Example 1

$IrO_2$ was produced by applying the Adams' fusion method.

In the case of the synthesis method, $IrO_2$ was prepared by adding 2 g of sodium nitrate and 5 g of water to 0.1 g of $IrCl_3$ metal precursor, stirring the mixture, and then subjecting the dried powder to a heat treatment at 450° C. for 30 minutes.

Comparative Example 2

Commercially available $IrO_2$ hydrate (Sigma Aldrich) was purchased.

Comparative Example 3

Commercially available $IrO_2$ Black (Alfa Aesar) 300 $H_2$ was purchased.

Comparative Example 4

Commercially available $IrO_2$ (Alfa Aesar) was purchased.

Experimental Example

FIG. 1 is a TEM image of a catalyst for water electrolysis according to an embodiment of the present invention.

Referring to FIG. 1, it can be seen that the catalyst for water electrolysis of the present invention has a shape stacked in the form of nano sheet.

FIG. 2 is an XRD diffraction pattern of a catalyst for water electrolysis according to an embodiment of the present invention.

Referring to FIG. 2, it can be seen that the catalyst for water electrolysis has main peaks with 2θ diffraction angles of 9.26±0.1°, 19.01±0.1°, 29.64±0.1°, 37.64±0.1°, 56.79±0.1°, 67.50±0.1°, and 79.81±0.1°.

Figure 5:
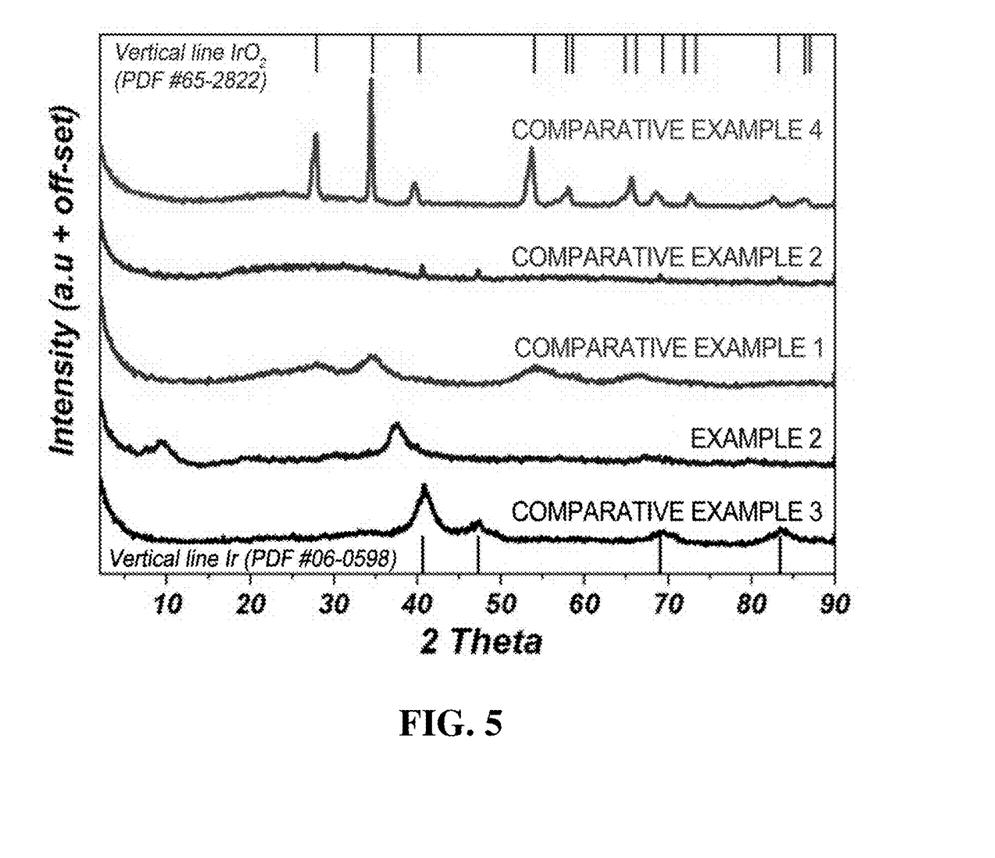
FIG. 5 is XRD diffraction patterns in Comparative Examples and Examples according to an embodiment of the present invention.

FIG. 5 is XRD diffraction patterns in Comparative Examples and Examples according to an embodiment of the present invention.

Referring to FIG. 5, it can be seen that the catalysts for water electrolysis in Examples are novel compounds in new forms since the XRD diffraction patterns in Examples do not match the patterns in other Comparative Examples and the structures do not match the existing iridium metal structure or iridium oxide structure.

Figure 6:
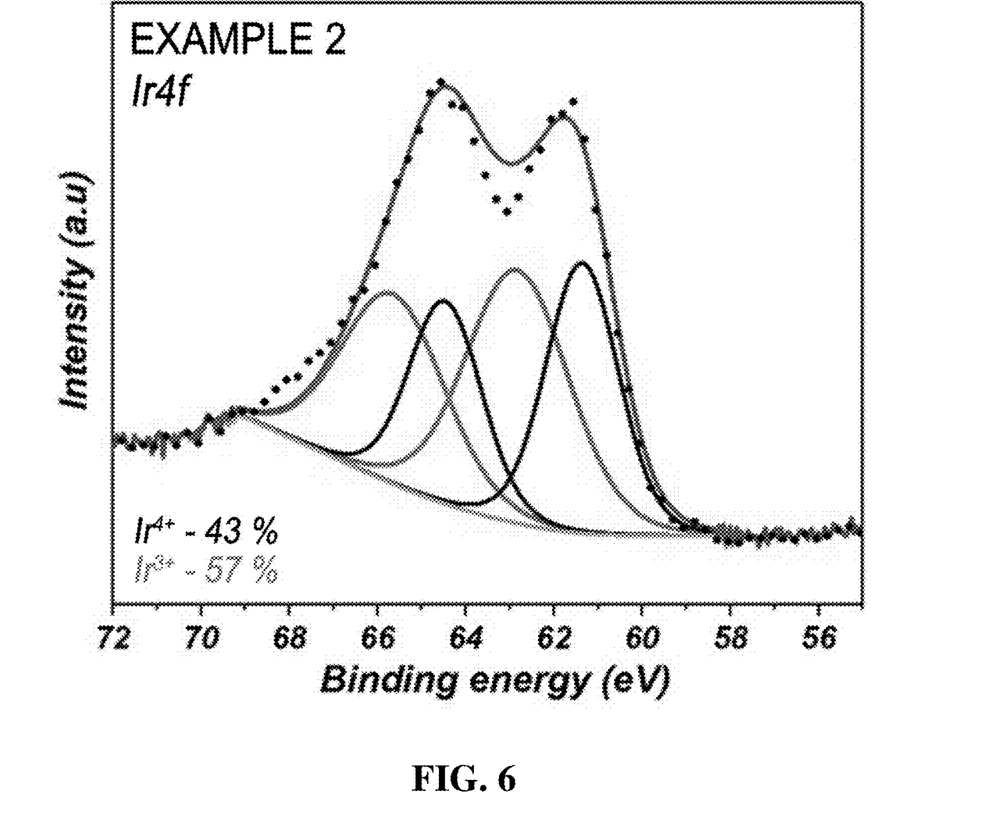
FIG. 6 is a spectrum of a catalyst for water electrolysis by XPS (X-ray photoelectron spectroscopy) according to an embodiment of the present invention.

FIG. 6 is a spectrum of a catalyst for water electrolysis by XPS (X-ray photoelectron spectroscopy) according to an embodiment of the present invention.

Referring to FIG. 6, the oxidation number of iridium atom can be determined through peak fitting in the XPS graph, and the molar ratio can be calculated from the area ratio. In XPS, the position of metal iridium (Ir) with 0 oxidation number corresponds to a binding energy range of 61.2 eV or less, the position of metal iridium (Ir) with +3 oxidation number corresponds to a binding energy range of 62.5 to 63 eV, and the position of metal iridium (Ir) with +4 oxidation number corresponds to a binding energy range of 61.5 eV to 62.3 eV or 63.5 eV. Hence, the contents of iridium with 0 oxidation number, +3 oxidation number, and +4 oxidation number in Example 2 can be confirmed in FIG. 6. The contents in the respective Examples and Comparative Examples are presented in the following Table 2.

TABLE 2

| Unit at % | $Ir^0$(0 oxidation number) | $Ir^{3+}$(+3 oxidation number) | $Ir^{4+}$(+4 oxidation number) |
|---|---|---|---|
| Example 1 | — | 39 | 61 |
| Example 2 | — | 57 | 43 |
| Example 3 | — | 63 | 37 |
| Example 4 | 10 | 63 | 27 |
| Example 5 | 69 | — | 31 |
| Example 6 | 76 | — | 24 |
| Comparative Example 2 | — | 54 | 46 |
| Comparative Example 3 | 83 | 17 | — |

Figure 7:
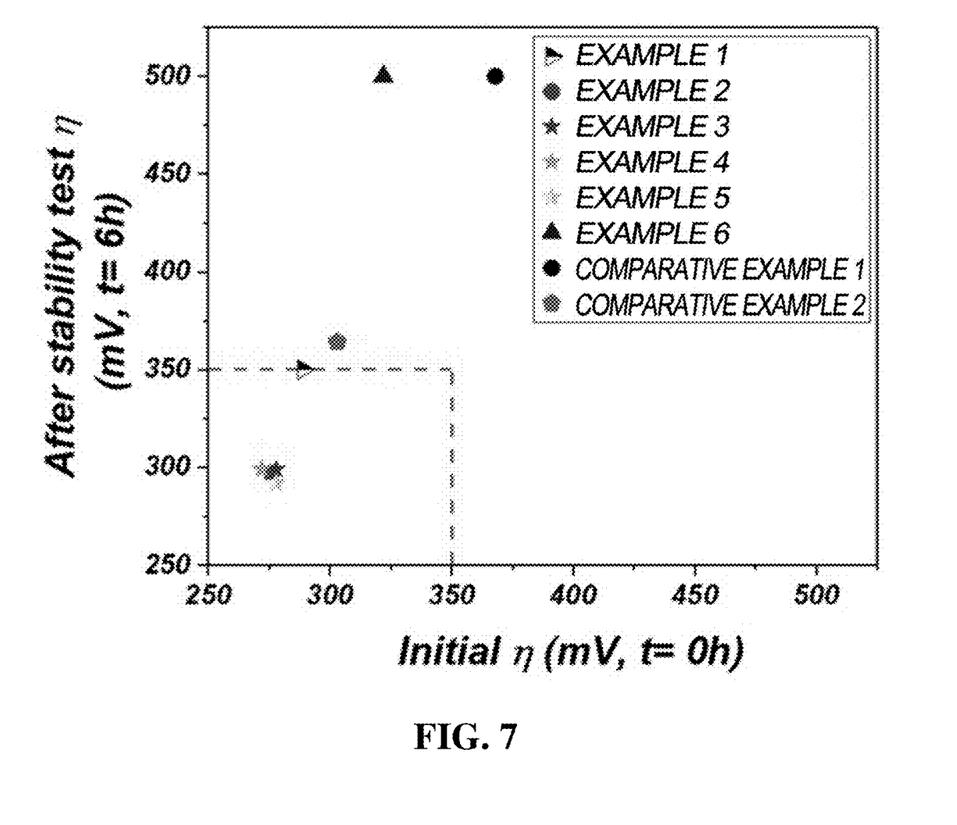
FIG. 7 is a graph illustrating the activity and stability of a catalyst for water electrolysis for oxygen evolution reaction (OER) at 10 mA cm$^{-2}$ according to an embodiment of the present invention.

Referring to Table 2, it can be seen that the molar ratio among metal Ir with the respective oxidation numbers tends to change depending on the amount of sodium acetate added. FIG. 7 is a graph illustrating the activity and stability of a catalyst for water electrolysis for oxygen evolution reaction (OER) at 10 mA $cm^{-2}$ according to an embodiment of the present invention.

Referring to FIG. 7, it can be seen that most of the catalysts for water electrolysis in Examples exhibit excellent catalytic activity as the overpotential (mVRHE) is 300 mV or less as measured at 10 mA cm$^{-2}$. The stability was evaluated by measuring the overpotential changes in a certain period of time after a constant current had been applied, and it can be seen that most of the catalysts for water electrolysis in Examples are stable as the overpotential is about 300 mV even after a constant current (10 mA cm$^{-2}$) has been applied for 6 hours.

Figure 8:
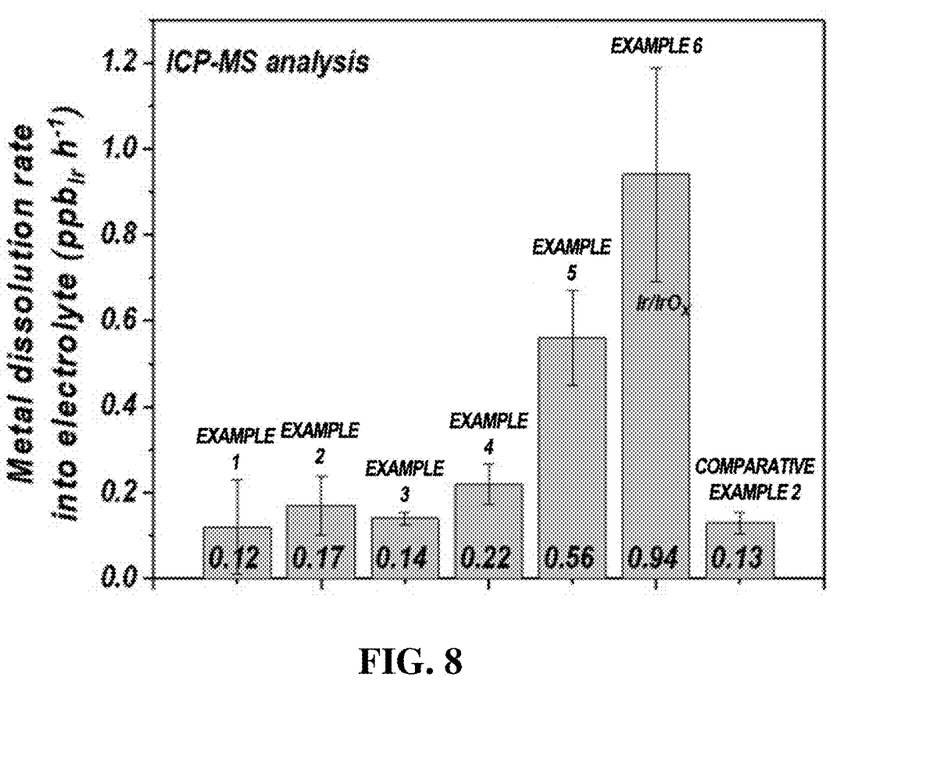
FIG. 8 is a graph illustrating the metal dissolution rate of a catalyst for water electrolysis into an electrolyte according to an embodiment of the present invention.

FIG. 8 is a graph illustrating the metal dissolution rate of a catalyst for water electrolysis into an electrolyte according to an embodiment of the present invention.

Referring to FIG. 8, it can be seen that the ratio of iridium with +4 oxidation number increases as the amount of sodium acetate increases, thus the amount of catalyst eluted decreases, and the electrochemical stability of the material increases.

According to an embodiment of the present invention, it is possible to provide a catalyst for water electrolysis exhibiting high activity and stability for the oxygen evolution reaction in water electrolysis.

The catalyst for water electrolysis can be produced under low temperature conditions as compared to those for conventional catalyst production and thus is economical, and the production cost of catalyst for water electrolysis can be decreased.

According to an embodiment of the present invention, it is possible to provide a catalyst for water electrolysis exhibiting excellent activity and stability for the oxygen evolution reaction in water electrolysis.

The catalyst for water electrolysis can be produced under low temperature conditions as compared to those for conventional catalyst production and thus is economical, and the production cost of catalyst for water electrolysis can be decreased.

The effects of the present invention are not limited to the above effects, and should be understood to include all effects that can be deduced from the configuration of the invention described in the detailed description or claims of the present invention.

The above description of the present invention is for illustrative purposes only, and those skilled in the art to which the present invention pertains will understand that the present invention can be easily modified into other specific forms without changing the technical spirit or essential features of the present invention. Hence, it should be understood that the embodiments described above are illustrative and non-limiting in all respects. For example, each component described as a single type may be implemented in a distributed manner, and similarly, components described as being distributed may also be implemented in a combined form.

The scope of the present invention is indicated by the claims to be described later, and all changes or modified forms derived from the meaning and scope of the claims and their equivalent concepts should be construed as being included in the scope of the present invention.

What is claimed is:

1. A catalyst for water electrolysis, the catalyst comprising:
   diffraction patterns with 2θ diffraction angles of 9.26±0.1°, 19.01±0.1°, 29.64±0.1°, 37.64±0.1°, 56.79±0.1°, 67.50±0.1°, and 79.81±0.1° in X-ray diffraction (XRD) analysis; and
   an iridium mixed phase including:
      a physical mixture of iridium(III) oxide ($Ir_2O_3$) and iridium(IV) oxide ($IrO_2$), or
      a physical mixture of metal iridium (Ir), iridium(III) oxide ($Ir_2O_3$), and iridium(IV) oxide ($IrO_2$),
   wherein the catalyst has a structure in which nanosheets having the iridium mixed phase are stacked.

2. A method for producing a catalyst for water electrolysis, the method comprising:
   forming a first mixture by adding an oxygen-providing additive to a solvent;
   forming a second mixture by adding a solution containing a reducing agent and an iridium precursor to the first mixture; and
   subjecting the second mixture to a heat treatment for oxidation-reduction reaction to produce the catalyst for water electrolysis, the catalyst comprising:
   diffraction patterns with 2θ diffraction anqles of 9.26±0.1°, 19.01±0.10°, 29.64±0.1°, 37.64±0.1°, 56.79±0.1°, 67.50±0.1°, and 79.81±0.1° in X-ray diffraction (XRD) analysis; and
   an iridium mixed phase including:
   a physical mixture of iridium(Ill) oxide (Ir2O3) and iridium(IV) oxide (IrO2), or a physical mixture of metal iridium (Ir), iridium(Ill) oxide (Ir2O3), and iridium(IV) oxide (IrO2),
   wherein the catalyst has a structure in which nanosheets having the iridium mixed phase are stacked.

3. The method according to claim 2,
   wherein the solvent includes one or more selected from the group consisting of ethylene glycol, diethylene glycol, and triethylene glycol.

4. The method according to claim 2,
   wherein the oxygen-providing additive includes one or more selected from the group consisting of sodium acetate, potassium acetate, lithium acetate, magnesium acetate, and calcium acetate.

5. The method according to claim 2,
   wherein the reducing agent includes one or more selected from the group consisting of formic acid, sodium formate, formaldehyde, acetaldehyde, benzaldehyde, propionaldehyde, butyraldehyde, and glyoxal.

6. The method according to claim 2,
   wherein the solution containing the iridium precursor includes one or more selected from the group consisting of iridium fluoride, iridium chloride, iridium bromide, iridium iodide, iridium acetate, iridium acetylacetonate, iridium nitrate, and hydrates thereof.

7. The method according to claim 2,
   wherein the iridium precursor and the oxygen-providing additive are reacted at a molar ratio of 1:0 to 1:14.6.

8. The method according to claim 2,
   wherein the heat treatment is performed at a temperature of 100° C. to 200° C. for 1 hour to 24 hours.

* * * * *